United States Patent [19]

Brandon, Jr. et al.

[11] Patent Number: 4,660,740

[45] Date of Patent: Apr. 28, 1987

[54] GASIFICATION OF FLUIDS

[75] Inventors: Howard R. Brandon, Jr., Atlanta; Dean M. Ball, Gainesville; Joanathan D. Guest, Decatur, all of Ga.

[73] Assignee: The SodaMaster Company of America, Decatur, Ga.

[21] Appl. No.: 831,138

[22] Filed: Feb. 18, 1986

[51] Int. Cl.[4] .......................... B67B 7/00; B67D 5/56; B01D 47/02; A23L 2/26

[52] U.S. Cl. ..................................... 222/1; 222/129.1; 222/556; 261/DIG. 7; 261/121.1; 99/323.1; 137/539

[58] Field of Search ................... 222/394, 556, 131, 1, 222/129.1, 61; 239/596, 552; 99/323.1, 323.2, 323; 137/539, 539.5; 261/DIG. 7, 64 R, 64 B, 121 R

[56] References Cited

U.S. PATENT DOCUMENTS

| | | | |
|---|---|---|---|
| 4,339,081 | 7/1982 | Lindqvist | 239/552 |
| 4,401,607 | 8/1983 | Child et al. | 261/DIG. 7 X |
| 4,422,371 | 12/1983 | Child et al. | 261/DIG. 7 X |
| 4,509,569 | 4/1985 | Adolfsson | 99/323.1 X |
| 4,548,828 | 10/1985 | Meyers | 261/DIG. 7 X |
| 4,555,371 | 11/1985 | Jeans | 261/DIG. 7 X |
| 4,564,126 | 1/1986 | Adolfsson | 222/61 |
| 4,588,536 | 5/1986 | Adolfsson | 261/DIG. 7 X |

*Primary Examiner*—Joseph J. Rolla
*Assistant Examiner*—Gregory L. Huson
*Attorney, Agent, or Firm*—George E. Kersey

[57] ABSTRACT

Method and apparatus for the gasification of liquids employing a separable pressure vessel which is easily dismantled for cleaning. The pressure vessel is charged from a gas source and provided with a relief valve that prevents the charging pressure in the vessel from exceeding a maximum pressure. Gas is introduced into the pressure vessel through a sparging orifice with an end that is also easily removable for cleaning. The pressure vessel has an outlet employing a single piece dispensing lever which includes not only ribs for opening the valve at the base of the pressure vessel but also an integrally molded restoring spring which has a special configuration for consolidating many of the functions which required separate pieces in the prior art.

15 Claims, 36 Drawing Figures

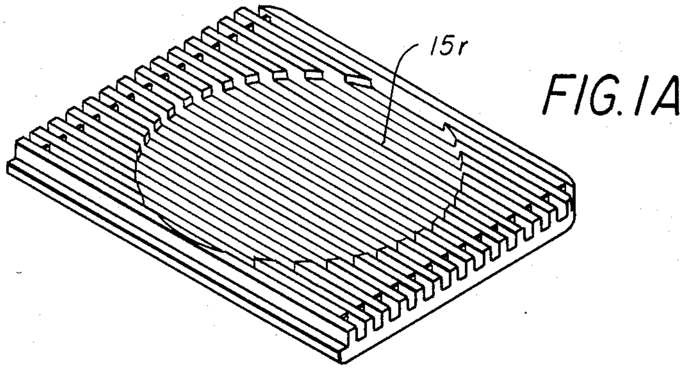
FIG. 1A
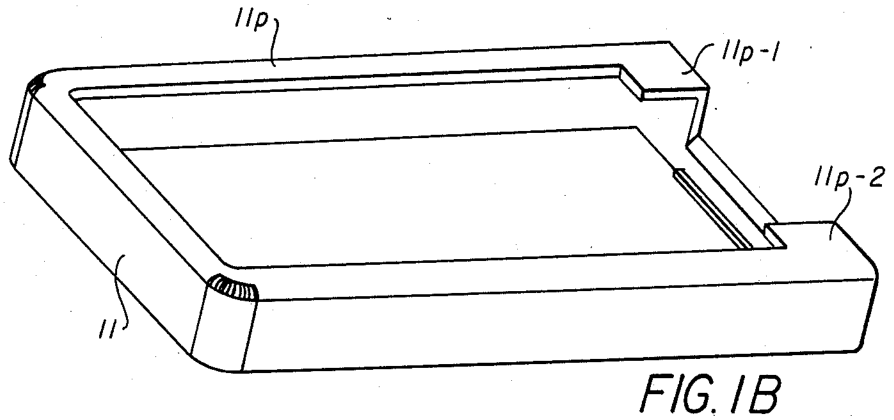
FIG. 1B
FIG. 1C
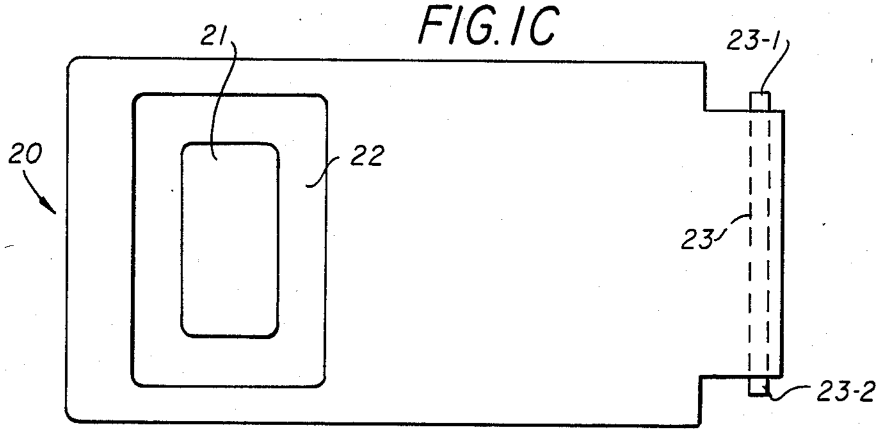

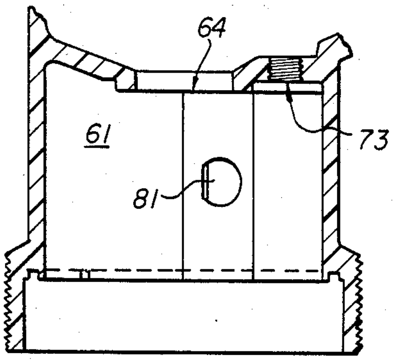
FIG. 4H
FIG. 5C
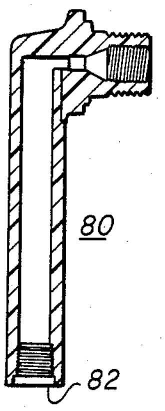
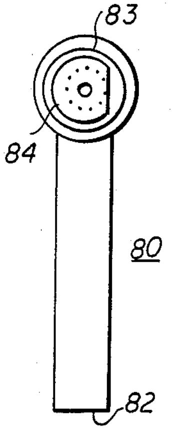
FIG. 5A
FIG. 5B
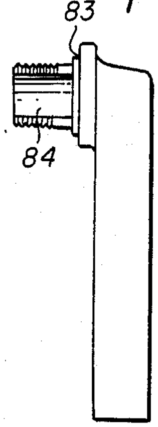
FIG. 5E
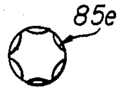
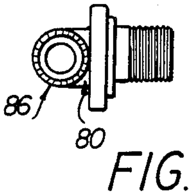
FIG. 5D
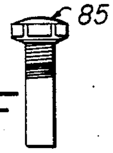
FIG. 5F
FIG. 5G FIG. 6D
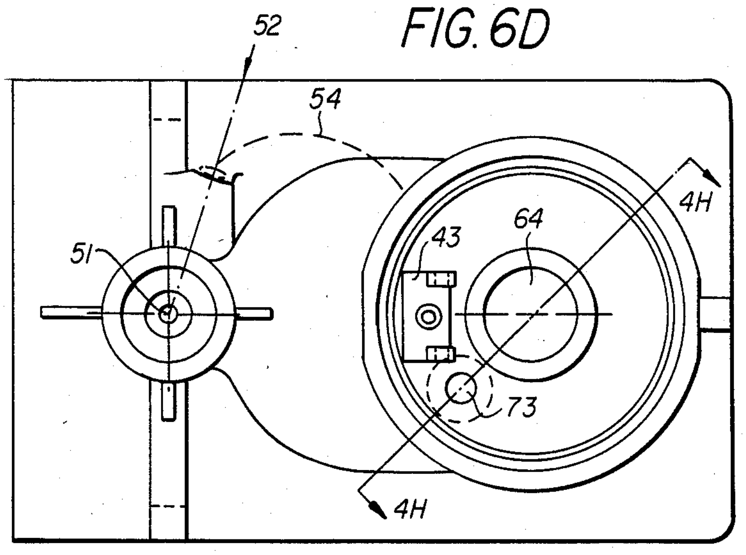
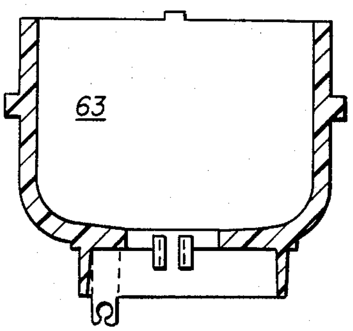
FIG. 7A
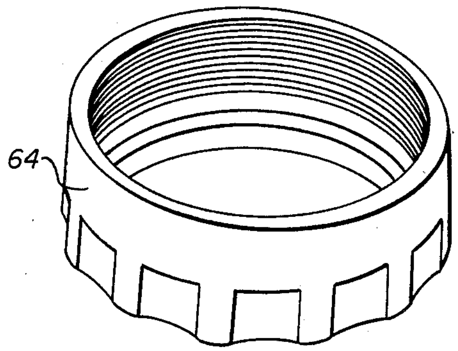
FIG. 7B

GASIFICATION OF FLUIDS

BACKGROUND OF THE INVENTION

This invention relates to the gasification of fluids by the introduction of gas into a chamber containing a fluid, such as a liquid, and, more particularly, to the aeration of beverages by introducing carbon dioxide into a liquid such as water.

The aeration of beverages by introduction of carbon dioxide is well known. One procedure involves the filling of a bottle with fluid and the attachment of the bottle to a source of carbon dioxide. After the carbon dioxide is discharged into the fluid, the bottle is removed from the charging source. This procedure requires a separate bottle which must be adapted to the carbon dioxide source. In addition, the bottle usuallly must have a special design since it is difficult to obtain a suitable seal to the charging source with a standard bottle. There are also risks in subjecting such bottles to pressure. The existence of even slight flaws during manufacture or transportation, for example, hairline cracks, can be a source of possible injury. In addition it is possible to pressurize an empty or partly filled bottle. The bottle then shatters and can cause injury to the user. Conversely a bottle may be overfilled with liquid, making it impossible to supply sufficient carbon dioxide. In order to aerate effectively, it is necessary to provide a volume for the compression of gasses.

To overcome the difficulties associated with pressurized bottles, attempts have been made to introduce carbon dioxide into a liquid within the aerating or charging apparatus. The aerated liquid is then released into a glass from the charging device. The use of such an apparatus can be complicated and in many cases unsafe.

For example, it is necessary to provide an inlet valve so that fluid to be pressurized can enter a pressure chamber. Unless the inlet valve has a suitable pressure seal, leaks during pressurization can interfere with proper functioning. It has been difficult to achieve inlet valves that permit ease of filling and simultaneously prevent escapage of gas during pressurization.

In addition it is important to provide the desired value of pressure. One practice is to include a relief valve that prevents gas pressure from being exerted unless the pressure chamber is filled with liquid to a prescribed level. Unfortunately if the chamber has the proper level of liquid, there is no way of preventing excess pressure from causing damage.

Another characteristic of devices with pressue chambers is that pressure is introduced through a set of apertures. If the apertures are not of the proper size, or if the pressure is insufficient, the resulting carbonation will be inappropriate. Although the apertures for the introduction of pressure may be initially designed to achieve a proper result, it is inevitable in practice for the apertures to become clogged. As a result there is a reduction in the size of the orifices through which the pressure is applied. In consequence, after a pressurization device has been used for any significant period of time, it is necessary to clean it if it is to continue to be operative. Unfortunately, it is difficult to cleanse the small apertures commonly used for carbonation.

A further characteristic of carbonation devices is the use of an outlet valve to release pressurized fluid from the interior chamber. It is common practice for these valves to be complicated. They must be closed during carbonation but must be easily opened when the carbonation is completed. Because of the many different requirements that the valve must satisfy, it has been common practice to produce a separate part for each function and to incorporate these parts into the outlet valve. The consequence has been a complex outlet valve that is subject to a number of failures.

Yet another characteristic of many machines is that they are cover hinge operated to initiate pressurization, but the hinge is secured to the housing in such a way that it is difficult to remove. This interferes with machine cleaning.

In addition, many machines are difficult to disassemble. The consequence is that the user must return the machine to an authorized factory or distributor outlet for servicing and periodic cleansing.

Accordingly, it is an object of the invention to facilitate the gasification of fluids. A related object is to facilitate the gasification of fluids by the release of carbon dioxide under pressure into the fluid.

Another object of the invention is to overcome the excess build-up of pressure in a gasification chamber that has caused explosions in some cases and consequent injury to the users.

A further object of the invention is to facilitate the introduction of the charging gas into the fluid. A related object is to assure substantially uniform charging pressure at all times and to permit the user to correct for any build-up of foreign substances that could interfere with the charging operation.

Still another object of the invention is to simplify the outlet valve for devices with internal pressurization of fluids. A related object is to consolidate functions which normally require separate pieces in order to provide a simplified structure which assures cooperation of the constituent elements and reduces the possibility that a failure of any one component would interfere with the operation of the others.

Yet another object of the invention is to make a fluid pressurizing device relatively fail-safe so that there is little danger of injury regardless of the abuse to which the device might be subjected.

SUMMARY OF THE INVENTION

In accomplishing the foregoing and related objects, the invention provides for gasifying a fluid using a pressure chamber that is in controllable communication with a source of pressurization. The pressure chamber has a relief valve that operates independently of its level of fluid, whenever the pressure exceeds a prescribed level. The pressure chamber has an inlet for the fluid being pressurized and an outlet for fluid after pressurization.

In accordance with one aspect of the invention the prescribed level at which the relief valve operates is the maximum pressure of the pressurization source. The relief valve includes a base in communication with the pressure chamber and a spring-loaded cap on the base. The cap is spring-loaded with respect to the base by an actuator spring that extends between the cap and a ball member at the inlet of the valve. An assist spring is positioned between the cap and the base. It has a larger diameter and a shorter length than the actuator spring.

In accordance with another aspect of the invention the pressure chamber has a trap door valve at its inlet. The trap door is hinged within the chamber and connected to a lever that extends outwardly through the inlet and is contactable from the exterior. The desired contact can be made by a hinged lid which is removably secured to the housing. When the hinged lid is elevated it provides access to the interior of the pressure chamber. When the lid is lowered it seals the inlet of the pressure chamber. Further depression of the hinged lid activates the pressure source. This may take place, in the case of a pressure cylinder, by having the hinge depress a valve at the outlet of the pressure cylinder. The lever that is connected to the inlet valve desirably has a plurality of non-colinear portions. One of the portions is engaged during the initial closure of the valve and the position of engagement moves progressively towards another of the portions as the valve is completely closed. Where the closure is effected by the hinged lid, an engagement portion of the lid comes into contact with the end portion of the lever as the lid is lowered. Thereafter the position of contact moves along the lever towards another portion of the lever. The interior of the pressure chamber desirably includes, along the circumference of the inlet, a sealing ring that is contacted by the valve during operation of the lever.

In accordance with a further aspect of the invention, the pressure chamber is pressurized using a conduit that extends downwardly within the pressure chamber to a conduit outlet which has openings in its side wall. These openings are desirably formed between indentations at the end of the wall and an inserted fitting. This facilitates cleaning of the openings by removal of the insert. The openings at the end of the wall are advantageously in the form of triangular grooves at equally spaced intervals.

In accordance with yet another aspect of the invention the outlet of the pressurized chamber includes a valve with a stem that is operated by a single-piece dispensing handle. The latter includes a set of ribs that contact the stem and an internal spring associated with the ribs. The spring has an extended S-shaped with a plurality of bends. It is desirable for the spring to have three regions of curvature.

In accordance with still another aspect of the invention the presure chamber is both sealed and activated by a hinged lid which is removably secured between a rim of the pressure chamber housing and pedestals that extend upwardly toward the rim to support axle ends of the hinged lid. This arrangement provides ready cleaning access to the inlet of the pressure chamber by removal of the hinged lid from the dispenser. The hinged lid is secure for rotational movement but is easily removable by pulling from between the pedestals and the lip of the housing.

In accordance with yet another aspect of the invention, fluid is poured into a pressure chamber, pressurized from a charging source, and the the chamber is relieved whenever its pressure exceeds that of the charging source. The inlet valve of the pressure chamber is pivotally positioned within the chamber and has a lever extending outwardly through the inlet into contact with an activator such as a hinged lid. Closure of the lid acts upon the lever and closes the inlet. Fluid in the pressure chamber can be pressurized through outlet openings in the wall of a charging conduit in the pressure chamber. The pressurized contents of the chamber can be released by depressing a handle that includes a connector for acting against an outlet valve of the pressure chamber and a restoration spring that is integrally included within the handle.

In accordance with a still further aspect of the invention a method of cleaning is provided by separating the lower portion of a pressure chamber from an upper portion. This exposes the end of a pressure conduit with wall outlet openings. Once the pressure conduit is accessable, foreign matter can be readily removed. When the outlet openings are formed between indentations at the end of the wall, and fitting inserted into the end wall, the cleansing operation involves the removal of the fitting. Any foreign matter is then easily removed from the indentations, as well as from the opposed face of the fitting. Once the pressure chamber has been cleansed, the separated lower portion is repositioned on the upper portion and brought into sealed engagement with the upper portion. This advantageously is achieved using a threaded ring member which provides the desired engagement between the upper and lower portions of the pressure chamber.

DESCRIPTION OF THE DRAWINGS

Other aspects of the invention will become apparent after considering several illustrative embodiments taken in conjunction with the drawings in which:

FIG. 1A is a perspective view of the drip tray for the device of FIG. 1A;

FIG. 1B is a perspective view of the cover for the device of FIG. 1A;

FIG. 1C is a plan view of the hinged lid for the cover of FIG. 1D;

FIG. 4H shows the mounting position for the relief valve of FIG. 4;

FIGS. 5A-5G illustrate details for a sparging nozzle in accordance with the invention;

FIGS. 6A-6D illustrate the relationship between the gas discharge outlet and the sparging device of FIGS. 5A-5G;

FIGS. 7A-7D illustrate details for the lower pressure chambers of FIG. 2.

DETAILED DESCRIPTION

Figure 1:
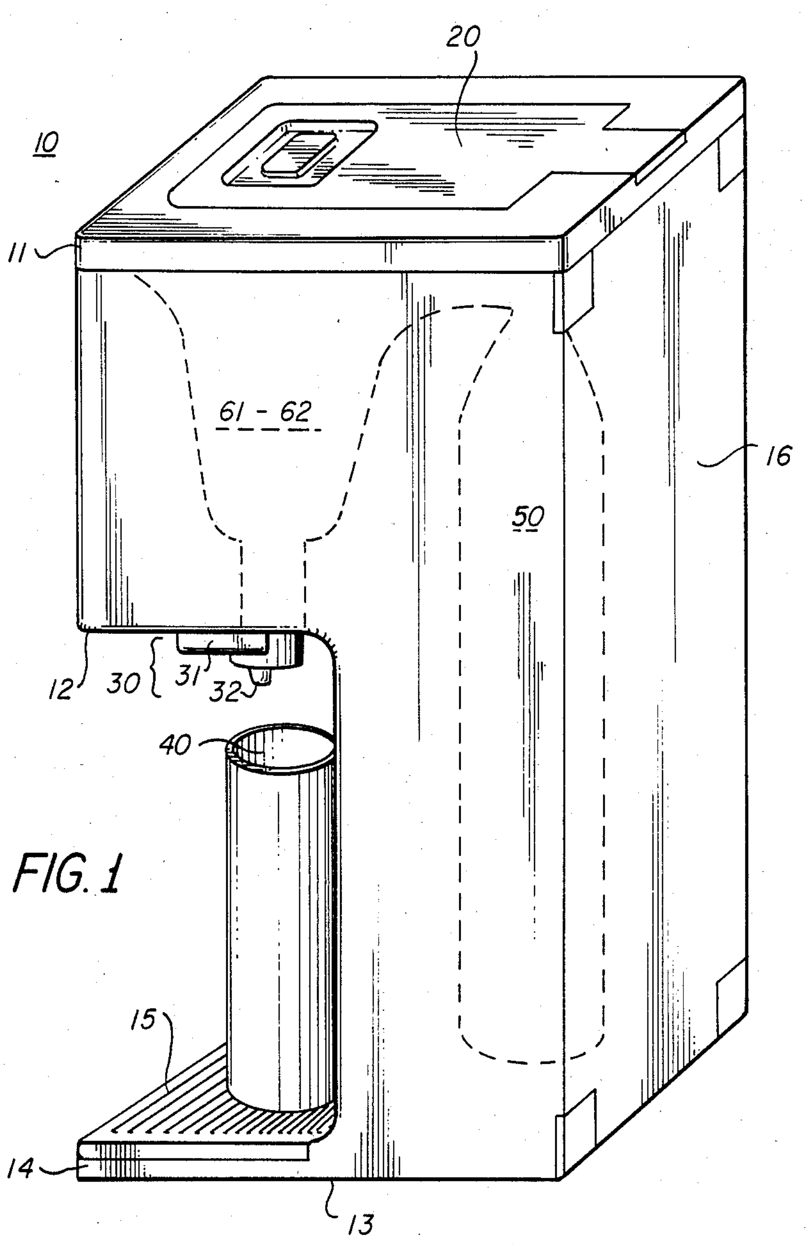
FIG. 1 is a perspective view of a gasification device in accordance with the invention.

With reference to the drawings, a gasifier machine in accordance with the invention is shown in FIG. 1. The gasifier 10 includes a hinged lid 20 at the top 11 of the body; a dispensing mechanism 30, including a handle 31 and an outlet 32 at the outlet level 12 for the device 10. The device 10 also includes a base 13 with a bottle platform 14 that supports a drip tray 15.

Figure 2:
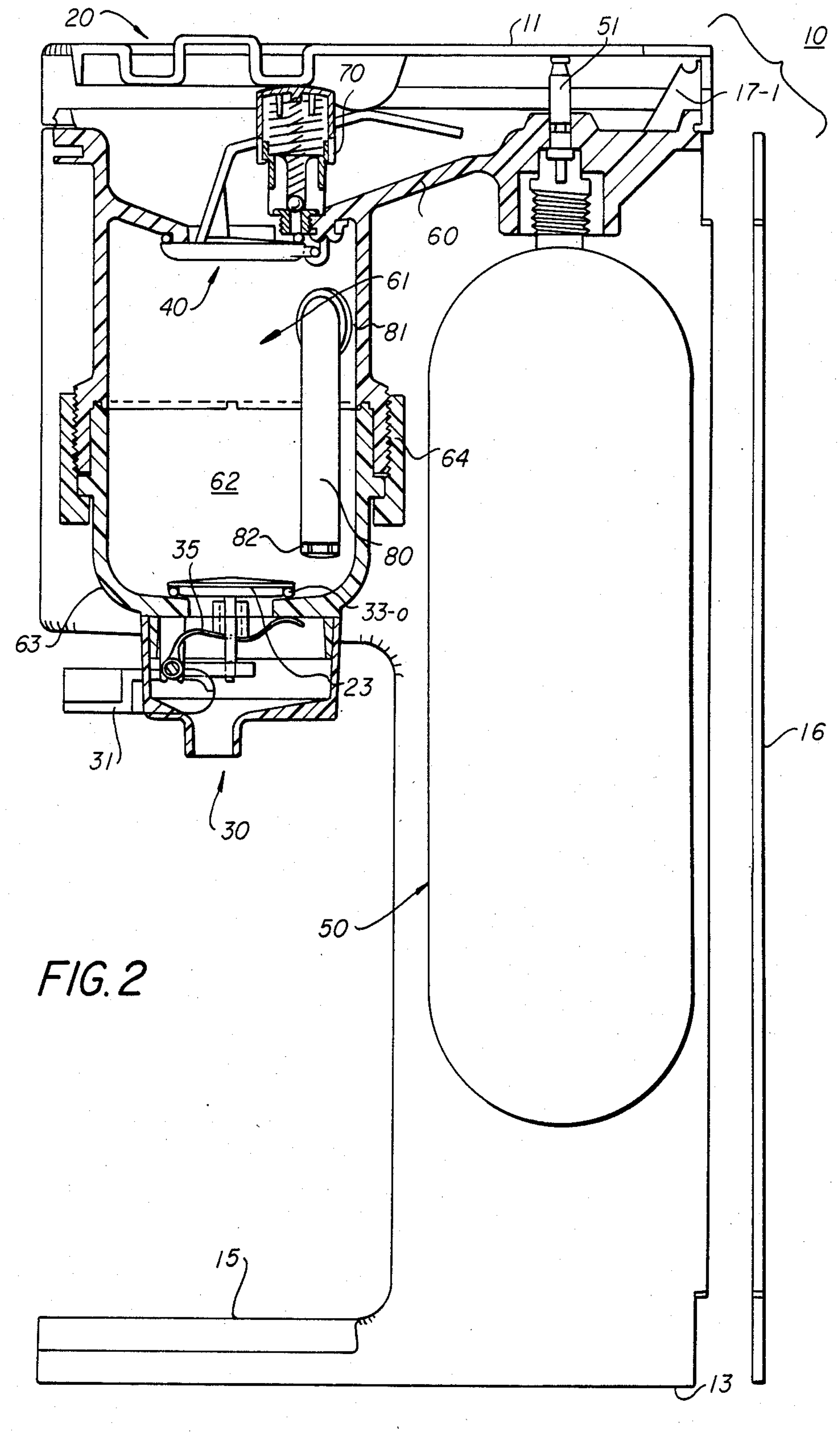
FIG. 2 is a cross sectional view of the gasification device of FIG. 1.
Figure 3:
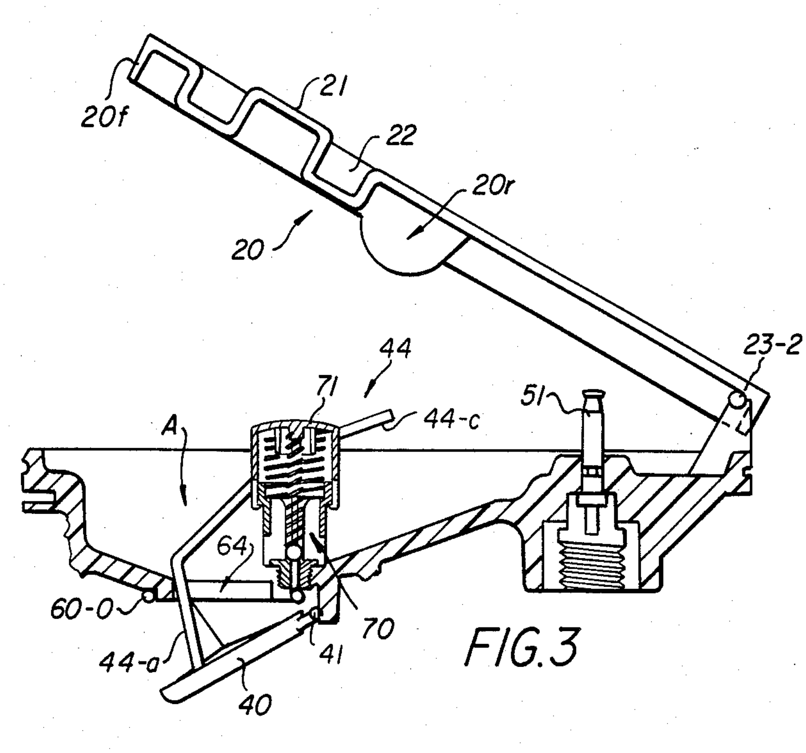
FIG. 3 is a partial view illustrating the actuation of the inlet valve for the gasification device of FIG. 1.

In the operation of the device 10 the back 16 is removed and a pressure cylinder 50 (shown in phantom in FIG. 1), for example containing carbon dioxide, is inserted into the machine. The next step is to elevate the hinged lid 20, as illustrated in FIG. 3 and pour the fluid that is to be pressurized or gasified into a pressure chamber 61–62 as illustrated in FIG. 2 (shown in phantom in FIG. 1). Once the fluid to be gasified is poured into the pressure chamber 61–62, pressurization is accomplished by closing the hinged lid 20 to operate the gas cylinder 50 and allow gas pressure from the cylinder 50 to enter the fluid in the pressure vessel 61–62.

After the fluid is pressurized, it can be dispensed into a suitable container such as the glass 40 shown on the drip tray 15. The pressurized fluid is dispensed by simply depressing the dispensing handle 31 to allow the pressurized fluid to be released through the outlet 32 into the glass 40.

Details for the drip tray 15, including a recess 15*r* for the glass 40 are shown in FIG. 1A. Similarly, details for the top 11, and its upper lip 11*p*, which receives the hinged lid 20 at edges 11*p*-1 and 11*p*-2, are shown in FIGS. 1B and 1C. The lid 20 has a finger gripping portion 21 surrounded by a depression 22 which has further functions illustrated in FIG. 2. The lid 20 also has an axle 23 with ends 23-1 and 23-2 that are received beneath respective lip edges 11*p*-1 and 11*p*-2 (FIGS. 1B and 1C).

Because of the safety features built into the device 10 in accordance with the invention, the danger of any explosion or safety hazard has been minimized, and in addition the operation of gasification has been considerably simplified.

In the cross sectional view of FIG. 2 the internal constituents of the gasifier 10 are shown. A pressure bottle 50 which is insertable into the dispenser 10 through the removed back 16 is threaded into a housing 60 which includes the upper part 61 of a pressure chamber. The pressure chamber is completed by a lower portion 62 which is held to the upper portion 61 by an assembly ring 63. Mounted on the housing 60 is a relief valve 70 in the general vicinity of an inlet valve 40. Also shown in FIG. 2 is a sparger assembly 80 which is discussed in detail below.

Figure 3B:
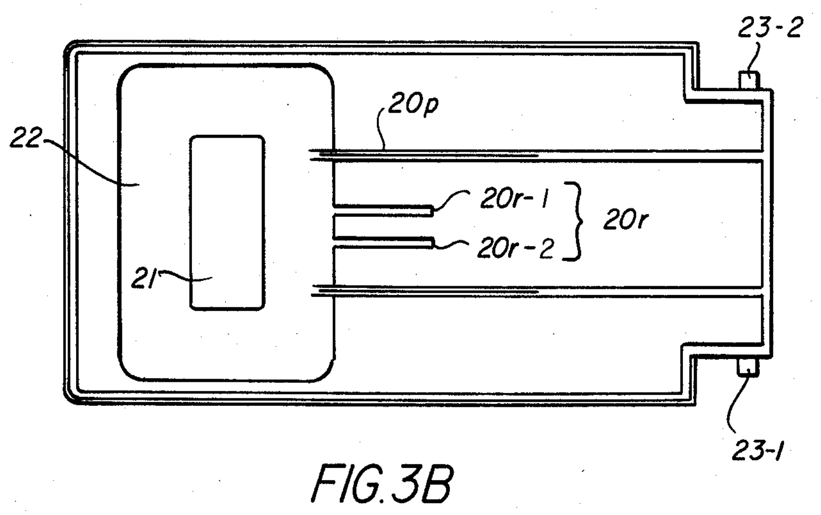
FIG. 3B is a bottom view of the hinged lid of FIG. 3.
Figure 3A:
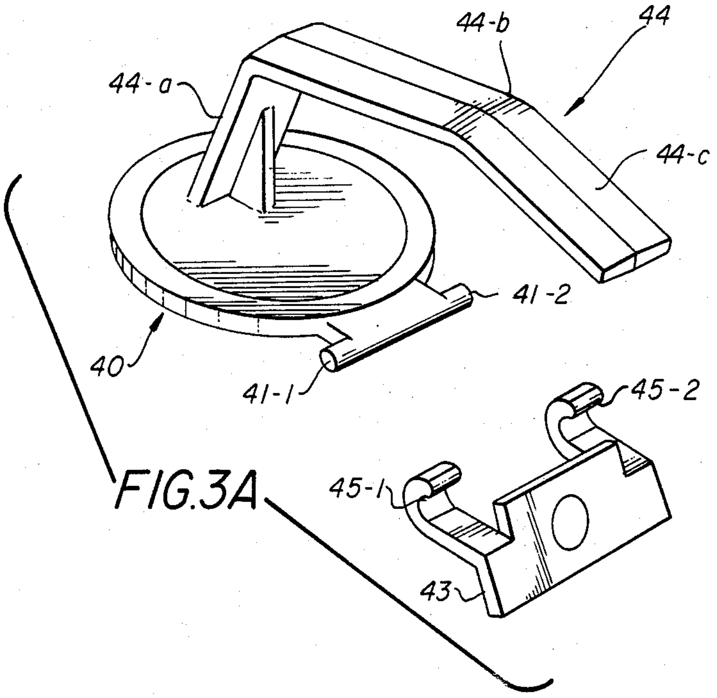
FIG. 3A is a perspective view of the inlet valve and mount of FIG. 3.

An understanding of the functioning of the various internal constituents of the gasifier 10 begins with a consideration of FIG. 3 in which the hinged lid 20 is shown in an elevated position. By comparison with FIG. 2, the elevation of the hinged lid 20 to the position shown in FIG. 3 allows the inlet valve 40 to open by the simple effect of gravity. As a result the inlet valve 40 pivots like a trap door about an axle 41. The axle is supported by a mount 43 (shown in FIG. 3A) in the housing 60.

The extent of the opening of the inlet valve 40 is determined by the position of the bent lever 44 against the wall of the inlet 64 in the housing 60. As shown in FIG. 3 a first segment 44-*a* of the bent lever 44 rests against the wall of the inlet 64. The fluid to be gasified is simply poured through the inlet 64 in the direction indicated by the arrow A. Once the pressure chamber 61–63 has been filled to the desired level the hinged lid 40 is moved to its closed position as shown in FIG. 2. This causes an actuating rib 20*r* to come into contact with the third segment 44-*c* of the bent lever 44. As indicated by the bottom view of the lid 20 in FIG. 3B, activating rib 20*r* is formed by two projections 20*r*-1 and 20*r*-2. As the hinged lid 40 moves to its closed position shown in FIG. 2 the rib 20*r* moves along the third segment 44-*c* past the knee to the second segment 44-*b*. This moves the inlet valve 40 upwardly so that its edges come into contact with a sealing O-ring 61-*o* of the upper portion of the pressure chamber 61. This provides a suitable pressure seal with respect to the gasses that enter the pressure chamber from the charging cylinder 50.

As also indicated in FIG. 3 the housing 60 mounts a valve actuator 51 for the cylinder 50. The actuator 51 is of standard design for use with carbon dioxide cylinders. When hinged lid 20 is in its closed position as shown in FIG. 2, further downward depression of the lid depresses the actuator into contact with the outlet valve of the cylinder 50. This causes a release of carbon dioxide into an outlet 52 shown in FIGS. 6A through 6D.

Figure 6A:
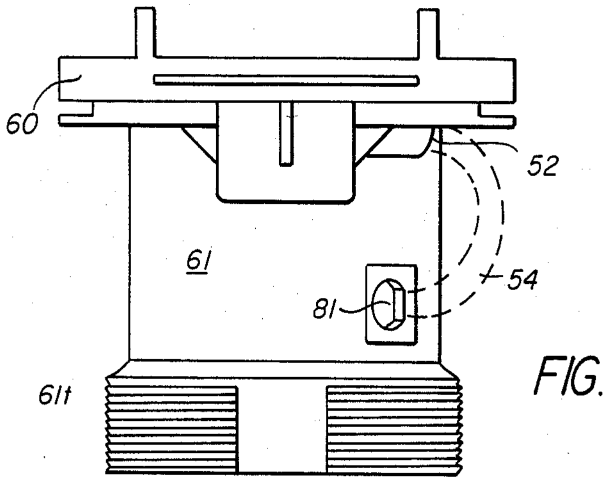
Figure 6B:
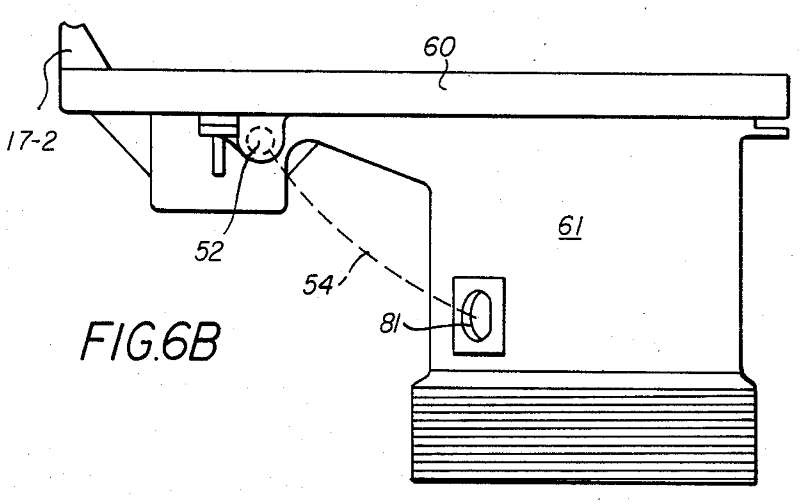
Figure 6C:
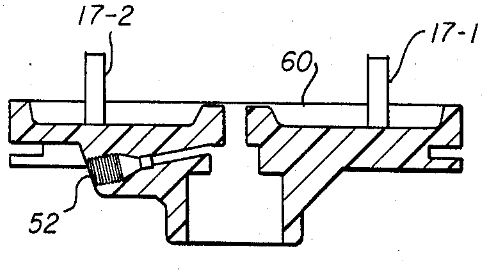

It is to be noted that FIG. 6C is a transverse cross section of the housing 61 with the actuator 51 removed. As indicated in phantom in FIGS. 6A, 6B, and 6D a conduit 54 extends from the threaded portion at the end of the outlet passage 52 to the position 81 of the sparger 80 shown in FIG. 2. The sparger allows the carbon dioxide from the cylinder 50 to be controllably released at a nozzle end of the tube 82 in FIG. 2.

It is to be noted in connection with the release of carbon dioxide through the nozzle end of the tube 82 of the sparger 80, caused by operation of the valve actuator 51, due to downward depression of the lid 20, a projection 20*p* (FIG. 3B) comes into contact with the cap 71 of the relief valve 70. This momentarily depresses the cap 71 against its internal spring in order to serve a pressure control function that is described below in connection with the detailed discussion of the relief valve 70. It is sufficient to note initially that the relief valve 70 prevents any excess accumulation of pressure in the chamber 62, regardless of whether or not the device 10 has been abused or improperly manipulated by the user.

Pressurization takes place as long as the lid 20 is pushed downwardly to operate the actuator 51. The user knows that pressurization has been completed when the relief valve 70 operates. At that point he is ready to dispense the gasified contents of the chamber 62 into the glass 40. This is accomplished by downward depression of the dispensing handle 31. This causes the outlet valve 33 to be elevated by the stem 23 that is connected to the handle 31 (FIG. 2). This action takes place by rotation against a restoring spring 35 which is moved forward by rotation. With the opening of the valve 33 the pressurized contents of the chamber 32 can enter the glass 40. When the dispensing handle is released, the spring 35 restores the cover to its closed position against a sealing ring 33-*o* which is secured to the cover 33.

A number of the unique features of the invention are apparent from FIG. 2 and associated Figures. The pressure relief valve 70, whose function and operation are described in detail below, assures that excess pressure cannot build up in the chamber 61–63. In addition the chamber, formed by the upper portion 61 and the lower portion 63, is made of an acetyl resin which is characterized by creep as opposed to fracture in the presence of prolonged pressure. As a result even if a failure were to take place in either the upper portion 61 or the lower portion 63 the result would produce and crack that would allow the release of pressure and thus prevent the kind of shatter that characterizes the conventional pressure chamber.

Another feature of the pressure chamber is that it is in two portions 61 and 63 which are sealed by a ring 64 (FIG. 7B). This allows ready disassembly of the chamber. When this is done the lower portion 63 with the associated outlet valve 30 is removable through an opening in the outlet level 12 of the dispenser. This in turn exposes the nozzle end of tube 82 of the sparger 80 permitting it to be unscrewed and easily cleaned. This is by contrast with the prior art devices where the sparger outlet was relatively inaccessible and even when reached was not in a condition to permit easy cleaning.

Figure 4A:
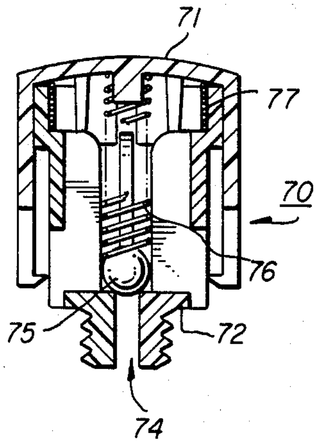
FIG. 4A is a view of the relief valve of FIG. 4 in its assembly position.
Figure 4:
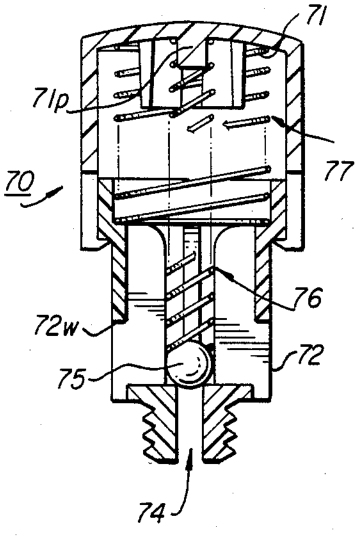
FIG. 4 is an enlargement of the pressure relief mechanism for the gasification device of FIG. 1.

Details of the relief valve 70 are set forth in FIGS. 4 and 4A–4H which shows views of the valve 70 and its constituents. The view in FIG. 4 is an enlargement of the valve 70 shown in FIGS. 2 and 3. The valve 70 includes a cap 71 to which pressure is applied by the lid during the charging operation. In addition the valve 70 includes a base 72 that is threaded into the upper portion of the chamber 61 at the position 73 shown in FIG. 4H. An inlet duct 74 communicates with the interior of the upper channel 61.

Consequently, pressure from the upper chamber 61 is applied through the duct 74 to a ball seal 75. Counter pressure is exerted on the ball seal 75 by an actuator spring 76 that extends to a projection 71*p* of the cap 71. In addition the relief valve 70 contains an assist spring 77. The assist spring 77 assures that excess pressure cannot be applied to the cap 71 and prevent it from functioning. Upon release of the hinged lid 20, assist spring 77 acts against the lid 20 to lift it, while the actuator spring 76 expands to allow pressure in the chamber 61 to escape and return to an ambient state. As a result of the unique design of the relief valve shown in FIG. 4A the possibility of having excess pressure in the chamber 61–63 is prevented.

FIG. 4A shows the relief valve 70 in its assembly position with the assist spring 77 fully compressed. In practice when the lid 20 is depressed downwardly to operate the valve actuator 51, the front lip 20*f* [FIG. 3] can only move downwardly into contact with the lip 61*p* shown in FIG. 2, so that the maximum displacement of the cap 71 in practice does not extend beyond the upper wall of the inner member 72 at the position 72*w* shown in FIG. 4.

Figure 4C:
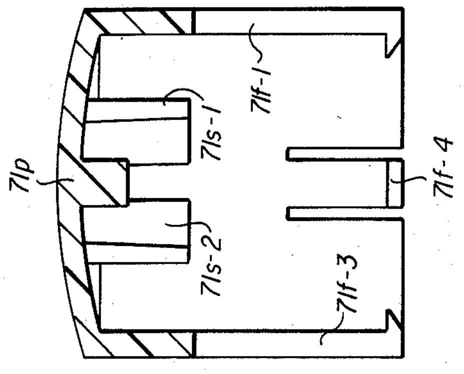
FIGS. 4B-4G show assembly details for the relief valve of FIG. 4.
Figure 4E:
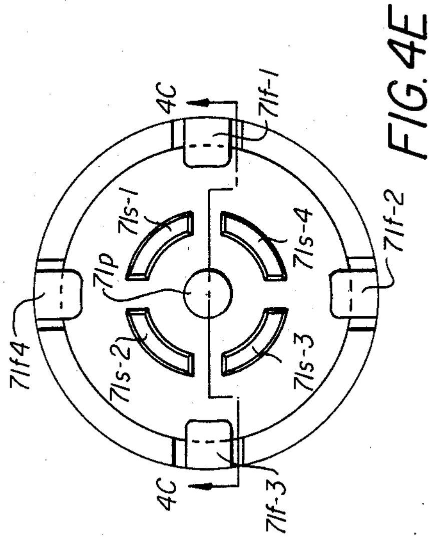
Figure 4B:
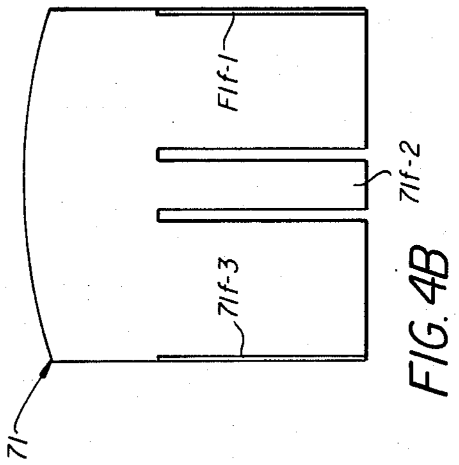
Figure 4D:
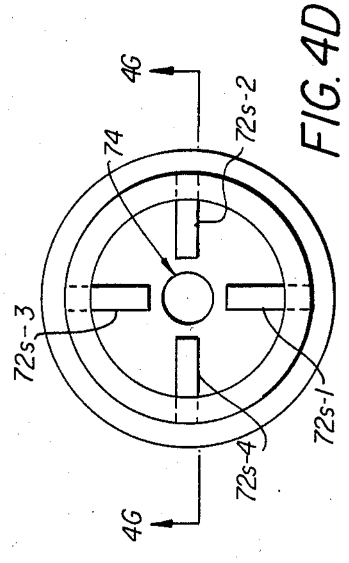

FIG. 4B is a plan view of the cap 71, with engagement fingers 71*f*-1 through 71*f*-4. FIG. 4C is a sectional view of FIG. 4B, while FIG. 4E is a bottom view.

Figure 4G:
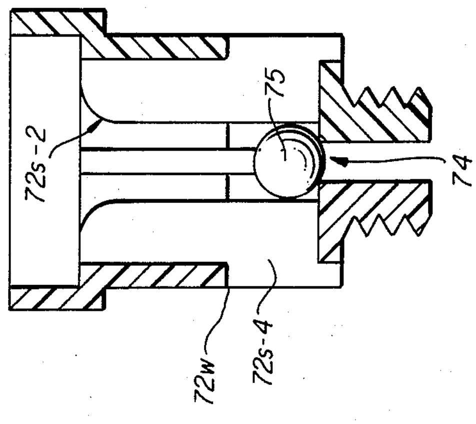
Figure 4F:
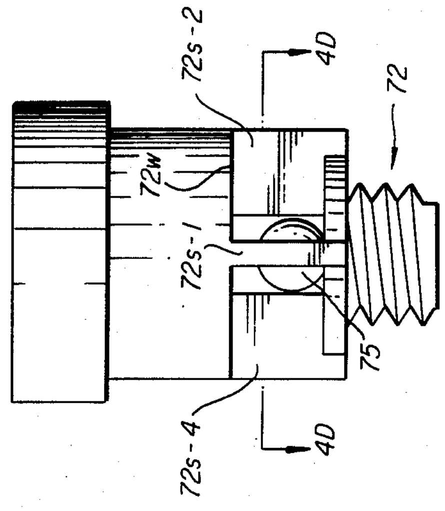

FIG. 4F is a plan view of the base 72, which is shown in transverse section in FIG. 4F. FIG. 4G is a longitudinal section of FIG. 4F.

FIG. 4H shows the mounting position 73 for the relief valve 70.

FIGS. 5A–5G illustrate details of the sparger 80. As indicated the sparger 80 includes an outlet tube 82 that extends from an inlet 81 [shown connected to a conduit 54 leading to the outlet or duct 52 for the gas cylinder]. The mount 83 for the sparger 80 has a truncated circular base 84 in order to assure proper orientation of the sparger when mounted in the upper cylinder 61. The bottom of the tube 82 is especially designed to assure proper operation at all times. For that purpose the bottom contains a series of triangular grooves 86 so that the actual gas outlet is formed between the triangular grooves and a cap 85. Consequently the cleaning operation is merely a matter of unscrewing the cap 85 and removing it from the tube 82. This is by contrast with the typical sparger where not only are the outlets inaccessible, but the actual gas discharge ducts are in the form of tiny apertures which are easily clogged and not easily cleaned even if access could be had to them.

FIGS. 6A–6C show the relationship between the pressure output port 52 for the cylinder 50 and the sparger inlet 81.

FIG. 6D is a bottom view of the housing 60 showing the mounting position 73 for the relief valve 70, the inlet 64 and the mount 43 for the inlet valve 40 (not shown). Also shown is the actuator 51 for the cylinder 50.

FIGS. 7A–7H show features of lower portion 63 of the pressure chamber and the associated output valve 30.

The lower chamber 63 of FIG. 7A has a base support for the control valve 30. FIG. 7B shows the cap 64 by which the lower chamber 63 is removably attached to the upper chamber 61, as shown in FIG. 2.

Figure 7C:
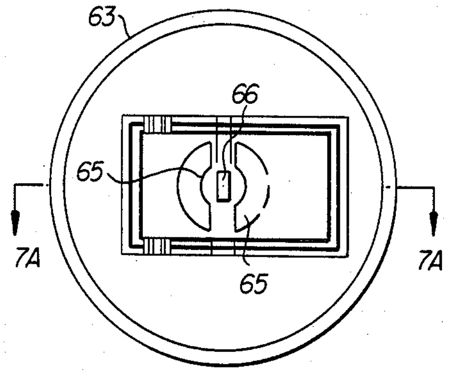
Figure 7D:
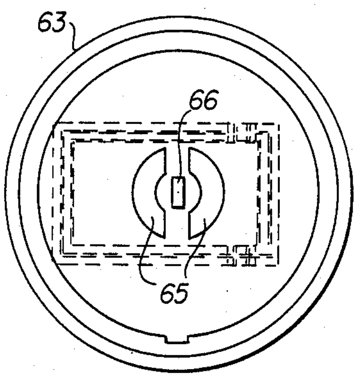

FIG. 7C is a bottom view of the lower chamber 63, while FIG. 7D is a top view, showing the outlet 65 sealed by the outlet valve 33. The stem 24 of the valve 33 moves in a rectangular aperture 66.

Figure 7E:
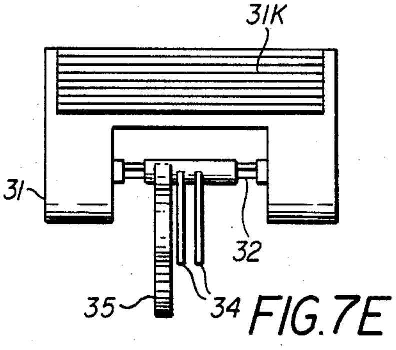
FIGS. 7E-7H illustrate details for the outlet handle of the outlet wave in FIG. 2.
Figure 7F:
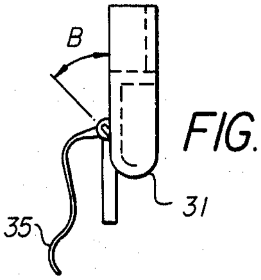
Figure 7G:
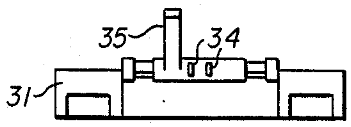
Figure 7H:
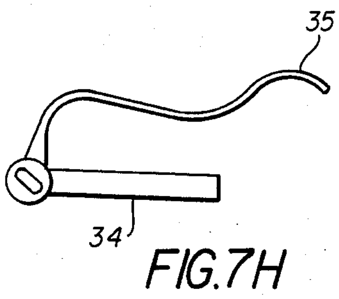

FIGS. 7E–7H show unique features of the outlet handle 31. As seen in FIG. 7E a spring 35 is mounted on the same collar 32 that includes fingers 34 that engage the stem 24 of the outlet valve 33 shown in FIG. 2. As a result all of the functions associated with the dispensing handle are incorporated in a single unit.

Another important feature of the invention is illustrated in FIG. 2 in conjunction with the removability of the hinged lid 20. For that purpose the hinged lid is mounted on a pair of pedestals 17–1 and 17–2, of which only the pedestal 17–1 is visible in FIG. 2. This pedestal is located between the housing 60 and the top 11. Consequently, there is security during operation of the hinged lid, at the same time there is ease of removability of the hinged lid 20.

Other aspects of the invention will be readily apparent to those of ordinary skill in the art.

What is claimed is:

1. Apparatus for gasifying a fluid comprising a housing for a source of pressurization;

a pressure chamber within said housing in controllable communication with said source;

an inlet into said pressure chamber for the fluid to be pressurized;

and an outlet from said pressure chamber for pressurized fluid;

said pressure chamber having a relief valve that operates independently of the level of fluid therein whenever the pressure exceeds a prescribed level;

wherein said pressure chamber has a valve at said inlet in the form of a trap door hinged within said chamber and connected to a lever extending outwardly through said inlet and contactable from the exterior of said apparatus.

2. Apparatus as defined in claim 1 wherein said prescribed level is below the maximum pressure of said source.

3. Apparatus as defined in claim 1 wherein said pressure chamber is sealed and activated by a hinged lid which is removably secured between a rim of said housing and a pair of pedestals that extend upwardly toward said rim to receive axle ends of said hinged lid between said rim and said pedestals.

4. Apparatus as defined in claim 1 wherein said lever has a plurality of non-collinear portions, with one of said portions engaged by exterior contact during the initial closure of said valve and the position of engagement progressably moving towards another of said portions during the final closure of said valve.

5. Apparatus as defined in claim 4 wherein the interior of said pressure chamber includes a sealing ring along the circumference of said inlet and said sealing ring is contacted by said valve during the operation of said lever.

6. Apparatus as defined in claim 1 wherein said pressure chamber is pressurized through a conduit which extends from an inlet downwardly along an interior portion of said pressure chamber to outlet openings in the wall of said conduit.

7. Apparatus as defined in claim 6 wherein said outlet openings are indentations at the end of said wall and a fitting is inserted into said end;

thereby to facilitate the cleaning of said openings by the removal of said fitting.

8. Apparatus as defined in claim 7 wherein the openings at the end of said wall comprise triangular grooves at equally spaced intervals.

9. Apparatus as defined in claim 1 wherein said outlet of said pressurized chamber includes a valve having a stem operated by a single-piece dispensing handle including a set of ribs contacting said stem and an integral spring associated with said ribs.

10. Apparatus as defined in claim 9 wherein said spring has an extended S shape with a plurality of bends.

11. Apparatus as defined in claim 10 wherein said spring has three regions of curvature.

12. The method of gasifying a fluid which comprises the steps of:

a. pouring fluid into a pressure chamber thru an inlet;

b. closing said inlet to said pressure chamber by a valve pivotally positioned within said chamber using a lever extending through said inlet and outwardly into contact with a closing means;

c. pressurizing the fluid in said pressure chamber from a charging source;

d. relieving the pressure within said chamber whenever the pressure therein exceeds a prescribed level; and outwardly into contact with a closing source.

13. The method of claim 12 further including the step of pressurizing said fluid through outlet openings in the wall of a conduit in said chamber.

14. The method of claim 12 further including the step of releasing the pressurized contents of said chamber by depressing a handle that includes a connector for acting against an outlet valve of said pressure chamber and a restoration spring that is integrally included within said handle. 15.

15. Apparatus for gasifying a fluid comprising a housing for a source of pressurization;

a pressure chamber within said housing in controllable communication with said source;

an inlet into said pressure chamber for the fluid to be pressurized;

and an outlet from said pressure chamber for pressurized fluid;

said pressure chamber having a relief valve that operates independently of the level of fluid therein whenever the pressure exceeds a prescribed level;

wherein said relief valve includes a base with an inlet in communication with said pressure chamber and a cap on said base that is spring-loaded with respect to said base by an actuator spring extending between said cap and a ball member at the inlet of said relief valve and an assist spring is positioned between said cap and said base having a larger diameter and a shorter length than said actuator spring.

* * * * *